(12) United States Patent
Prieto et al.

(10) Patent No.: US 11,981,781 B2
(45) Date of Patent: May 14, 2024

(54) HIGH SPEED CROSS-LINKING OF GRAFTED PLASTOMERS

(71) Applicant: BOREALIS AG, Vienna (AT)

(72) Inventors: Oscar Prieto, Stenungsund (SE); Jeroen Oderkerk, Stenungsund (SE); Jari-Jussi Ruskeeniemi, Porvoo (FI); Stefan Hellström, Stenungsund (SE); Tanja Piel, Linz (AT); Daniela Mileva, Linz (AT)

(73) Assignee: Borealis AG, Vienna (AT)

( * ) Notice: Subject to any disclaimer, the term of this patent is extended or adjusted under 35 U.S.C. 154(b) by 77 days.

(21) Appl. No.: 17/276,275

(22) PCT Filed: Sep. 26, 2019

(86) PCT No.: PCT/EP2019/075978
§ 371 (c)(1),
(2) Date: Mar. 15, 2021

(87) PCT Pub. No.: WO2020/069951
PCT Pub. Date: Apr. 9, 2020

(65) Prior Publication Data
US 2022/0315716 A1     Oct. 6, 2022

(30) Foreign Application Priority Data
Oct. 2, 2018  (EP) ..................... 18198381

(51) Int. Cl.
| | | |
|---|---|---|
| *C08J 3/24* | (2006.01) | |
| *B29B 9/12* | (2006.01) | |
| *C08L 23/08* | (2006.01) | |
| *C08L 51/06* | (2006.01) | |
| *B29K 23/00* | (2006.01) | |

(52) U.S. Cl.
CPC .............. *C08J 3/248* (2013.01); *B29B 9/12* (2013.01); *C08L 23/0815* (2013.01); *C08L 51/06* (2013.01); *B29K 2023/16* (2013.01); *C08J 2323/08* (2013.01); *C08L 2310/00* (2013.01); *C08L 2312/08* (2013.01)

(58) Field of Classification Search
CPC .. C08F 210/16; C08F 210/14; C08F 230/085; C08F 255/08; C08F 8/00; C08F 8/12; C08K 5/42; C08L 51/06; C08L 2312/08; C08L 23/0815; C08J 3/248
See application file for complete search history.

(56) References Cited

U.S. PATENT DOCUMENTS

| | | | |
|---|---|---|---|
| 5,741,858 A | 4/1998 | Brann et al. | |
| 6,005,055 A | 12/1999 | Dammert et al. | |
| 8,268,924 B2 | 9/2012 | Carlsson | |
| 9,637,602 B2 | 5/2017 | Potter et al. | |
| 9,670,293 B2 | 6/2017 | Reznichenko et al. | |
| 9,670,347 B2 | 6/2017 | Tölsch et al. | |
| 9,708,481 B2 | 7/2017 | Wang et al. | |
| 9,745,431 B2 | 8/2017 | Potter et al. | |
| 9,751,962 B2 | 9/2017 | Wang et al. | |
| 9,777,142 B2 | 10/2017 | Sandholzer et al. | |
| 9,802,394 B2 | 10/2017 | Cavacas et al. | |
| 9,828,698 B2 | 11/2017 | Wang et al. | |
| 9,890,275 B2 | 2/2018 | Sandholzer et al. | |
| 9,976,020 B2 | 5/2018 | Nummila-Pakarinen et al. | |
| 10,011,708 B2 | 7/2018 | Lampela et al. | |
| 10,030,109 B2 | 7/2018 | Boragno et al. | |
| 10,040,888 B1 | 8/2018 | Gopalan et al. | |
| 10,040,930 B2 | 8/2018 | Gloger et al. | |
| 10,100,185 B2 | 10/2018 | Wang et al. | |
| 10,100,186 B2 | 10/2018 | Wang et al. | |
| 10,227,427 B2 | 3/2019 | Reichelt et al. | |
| 10,450,451 B2 | 10/2019 | Wang et al. | |

(Continued)

FOREIGN PATENT DOCUMENTS

| | | |
|---|---|---|
| CN | 1930230 A | 3/2007 |
| CN | 101903452 A | 12/2010 |

(Continued)

OTHER PUBLICATIONS

U.S. Appl. No. 14/914,501, filed Feb. 25, 2016.
U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 04, 2016.
U.S. Appl. No. 15/101,837, filed Jun. 3, 2016.

(Continued)

*Primary Examiner* — Mark S Kaucher
(74) *Attorney, Agent, or Firm* — Leydig, Voit & Mayer, Ltd.

(57) ABSTRACT

The present invention discloses a process for providing a cross-linked composition, the process comprising the steps of (a) providing an ethylene-α-olefin plastomer having—a density of from 850 kg/m³ to 900 kg/m³; and—an melt flow rate (ISO 1133, 2.16 kg, 190° C.) of 0.3 to 50 g/10 min; (b) grafting the ethylene-α-olefin plastomer with silane crosslinker such that the content of silane crosslinker is in the range of 0.1 to 10.0 wt. % with respect to the grafted ethylene-α-olefin plastomer; (c) contacting said grafted ethylene-α-olefin plastomer with 2 to 8 wt. % of a tin-free silane crosslinking catalyst with respect to the resulting mixture of grafted ethylene-α-olefin plastomer and tin-freesilane crosslinking catalyst, wherein said tin-free catalyst comprises a Brönsted acid at 23° C. and 50% relative humidity for at least 15 minutes thus forming a cross-linked composition, wherein gel content of said cross-linked composition after 15 min is at least 60%.

8 Claims, No Drawings

(56) References Cited

U.S. PATENT DOCUMENTS

| | | | |
|---|---|---|---|
| 10,513,609 | B2 | 12/2019 | Cree |
| 10,519,259 | B2 | 12/2019 | Resconi et al. |
| 10,870,718 | B2 | 12/2020 | Denifl et al. |
| 10,934,422 | B2 | 3/2021 | Sandholzer et al. |
| 2002/0188078 | A1* | 12/2002 | Castellani ............... C08L 23/12 525/240 |
| 2004/0167293 | A1 | 8/2004 | Palmlof et al. |
| 2012/0178867 | A1 | 7/2012 | Esseghir et al. |
| 2016/0185946 | A1 | 6/2016 | Sandholzer et al. |
| 2016/0194486 | A1 | 7/2016 | Sandholzer et al. |
| 2016/0200838 | A1 | 7/2016 | Reznichenko et al. |
| 2016/0208085 | A1 | 7/2016 | Gloger et al. |
| 2016/0229158 | A1 | 8/2016 | Cavacas et al. |
| 2016/0237270 | A1 | 8/2016 | Wang et al. |
| 2016/0244539 | A1 | 8/2016 | Resconi et al. |
| 2016/0272740 | A1 | 9/2016 | Wang et al. |
| 2016/0280899 | A1 | 9/2016 | Töltsch et al. |
| 2016/0304681 | A1 | 10/2016 | Potter et al. |
| 2016/0311951 | A1 | 10/2016 | Reichelt et al. |
| 2016/0311988 | A1 | 10/2016 | Potter et al. |
| 2016/0312018 | A1 | 10/2016 | Vestberg et al. |
| 2016/0312019 | A1 | 10/2016 | Lampela et al. |
| 2016/0347943 | A1 | 12/2016 | Wang et al. |
| 2016/0347944 | A1 | 12/2016 | Wang et al. |
| 2017/0009068 | A1 | 1/2017 | Kahlen et al. |
| 2017/0029980 | A1 | 2/2017 | Wang et al. |
| 2017/0137617 | A1 | 5/2017 | Wang et al. |
| 2017/0166711 | A1 | 6/2017 | Boragno et al. |
| 2017/0218172 | A1 | 8/2017 | Wang et al. |
| 2017/0313867 | A1 | 11/2017 | Lampela et al. |
| 2017/0321048 | A1 | 11/2017 | Nummila-Pakarinen et al. |
| 2018/0079875 | A1 | 3/2018 | Braun et al. |
| 2018/0162109 | A1 | 6/2018 | Gopalan et al. |
| 2018/0163024 | A1* | 6/2018 | Gopalan .................. C08F 8/12 |
| 2018/0194881 | A1 | 7/2018 | Denifl et al. |
| 2018/0223025 | A1 | 8/2018 | Gopalan et al. |
| 2019/0382567 | A1* | 12/2019 | Sandholzer ............. C08L 23/16 |
| 2020/0263015 | A1 | 8/2020 | Kniesel et al. |
| 2020/0270434 | A1 | 8/2020 | Van Houcke et al. |
| 2020/0277479 | A1 | 9/2020 | Jerabek et al. |
| 2020/0308353 | A1 | 10/2020 | Jerabek et al. |
| 2020/0347216 | A1 | 11/2020 | Kniesel et al. |
| 2020/0392321 | A1 | 12/2020 | Gahleitner et al. |
| 2021/0114352 | A1 | 4/2021 | Oderkerk et al. |
| 2021/0171749 | A1 | 6/2021 | Kumar et al. |
| 2021/0171750 | A1 | 6/2021 | Gahleitner et al. |
| 2021/0214527 | A1 | 7/2021 | Gahleitner et al. |
| 2021/0214533 | A1 | 7/2021 | Kulshreshtha et al. |
| 2021/0238376 | A1 | 8/2021 | Kahlen et al. |
| 2021/0253836 | A1 | 8/2021 | Gahleitner et al. |
| 2021/0269560 | A1 | 9/2021 | Krallis et al. |
| 2021/0324189 | A1 | 10/2021 | Prieto et al. |
| 2021/0332227 | A1 | 10/2021 | Wang et al. |
| 2021/0347971 | A1 | 11/2021 | Wang et al. |

FOREIGN PATENT DOCUMENTS

| | | |
|---|---|---|
| CN | 105452384 A | 3/2016 |
| CN | 108431121 A | 8/2018 |
| EP | 1 254 923 A1 | 11/2002 |
| EP | 1 256 593 A1 | 11/2002 |
| EP | 1 309 631 B1 | 4/2005 |
| EP | 1 309 632 B1 | 4/2005 |
| KR | 10-1999-0014106 A | 2/1999 |
| KR | 10-2012-0090065 A | 8/2012 |
| KR | 10-2018-0096600 A | 8/2018 |
| RU | 2 292 365 C2 | 1/2007 |
| SE | 9304202 | 12/1993 |
| WO | WO 95/17463 A1 | 6/1995 |
| WO | WO 2005/068549 A1 | 7/2005 |
| WO | WO 2011/034836 A1 | 3/2011 |

OTHER PUBLICATIONS

U.S. Appl. No. 15/106,101, filed Jun. 17, 2016.
U.S. Appl. No. 15/103,783, filed Jun. 10, 2016.
U.S. Appl. No. 15/039,107, filed May 25, 2016.
U.S. Appl. No. 15/103,744, filed Jun. 10, 2016.
U.S. Appl. No. 15/102,628, filed Jun. 8, 2016.
U.S. Appl. No. 15/113,907, filed Jul. 25, 2016.
U.S. Appl. No. 15/113,922, filed Jul. 25, 2016.
U.S. Appl. No. 15/113,517, filed Jul. 22, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 15/741,861, filed Jan. 4, 2018.
U.S. Appl. No. 16/633,699, filed Jan. 24, 2020.
U.S. Appl. No. 16/761,743, filed May 5, 2020.
U.S. Appl. No. 16/761,757, filed May 5, 2020.
U.S. Appl. No. 16/652,115, filed Mar. 30, 2020.
U.S. Appl. No. 16/763,014, filed May 11, 2020.
U.S. Appl. No. 16/763,001, filed May 11, 2020.
U.S. Appl. No. 16/768,330, filed May 29, 2020.
U.S. Appl. No. 16/982,385, filed Sep. 18, 2020.
U.S. Appl. No. 17/050,550, filed Oct. 26, 2020.
U.S. Appl. No. 17/052,233, filed Nov. 2, 2020.
U.S. Appl. No. 17/047,350, filed Oct. 13, 2020.
U.S. Appl. No. 15/733,971, filed Dec. 1, 2020.
U.S. Appl. No. 17/259,216, filed Jan. 11, 2021.
U.S. Appl. No. 16/973,673, filed Dec. 9, 2020.
U.S. Appl. No. 17/273,687, filed Mar. 4, 2021.
U.S. Appl. No. 17/273,700, filed Mar. 4, 2021.
U.S. Appl. No. 17/273,711, filed Mar. 4, 2021.
U.S. Appl. No. 17/276,322, filed Mar. 15, 2021.
U.S. Appl. No. 17/413,612, filed Jun. 14, 2021.
*Analytical Chemistry*, Textbook for technical schools, Olshanova K.M., Piskareva S.K., Barashkov K.M., Editors, Moscow, Chemistry, (1980) p. 42.
*Industrial Application of Organosilicon Paint Coatings*, V.A. Molotova, Editor Moscow, "Chemistry" (1978) pp. 10-11.
*Multi-Component Systems Based on Polymers*, Y.A. Bespalov, N.G. Konovalenko, Editors, Leningrad, 1981, p. 71.
*Physical and Colloidal Chemistry*, A.I. Boldyrev, Editor (1983) p. 162.
Federal Institute of Industrial Property (FIIPS), Office Action in Russian Patent Application No. 2021106496/04(014017) (dated Oct. 20, 2021).
European Patent Office, International Search Report in International Application No. PCT/EP2019/075978 (dated Oct. 24, 2019).
European Patent Office, Written Opinion in International Application No. PCT/EP2019/075978 (dated Oct. 24, 2019).
European Patent Office, International Preliminary Report on Patentability- Chapter II in International Application No. PCT/EP2019/075978 (dated Sep. 28, 2020).
The Patent Office of the People's Republic of China, First Notification of Office Action issued in Chinese Patent Application No. 201980059458.5 (dated Apr. 27, 2023).
Garnier et al., "Melt spinning of silane-water cross-linked polyethylene-octene through a reactive extrusion process", *Reactive & Functional Polymers*, vol. 70: pp. 775-783 (2010).
Saudi Authority for Intellectual Property, Substantive Examination Report issued in Saudi Arabian Patent Application No. 521421274 (dated Jul. 31, 2023).
Korean Intellectual Property Office, Notice to Submit a Response issued in Korean Patent Application No. 10-2021-7006786 (dated May 25, 2023).
Korean Intellectual Property Office, Notice of Allowance in Korean Patent Application No. 2021-7006786 (Feb. 14, 2024).

\* cited by examiner

HIGH SPEED CROSS-LINKING OF GRAFTED PLASTOMERS

CROSS-REFERENCE TO RELATED APPLICATIONS

This patent application is the U.S. national phase of International Application No. PCT/EP2019/0759783, filed on Sep. 26, 2019, which claims the benefit of European Patent Application No. 18198381.8, filed Oct. 2, 2018, the disclosures of which are incorporated herein by reference in their entireties for all purposes.

FIELD OF THE INVENTION

The present invention is concerned with high-speed cross-linking of grafted plastomers.

BACKGROUND OF THE INVENTION

EPDM is mostly used rubber in sealing applications. Generally speaking, EPDM is a very versatile material. However, the handling and processing of EPDM requires many steps and is labour and energy intensive process. This is one reason why there is interest for polyolefin based rubbery materials. Soft, cross-linkable polymers can indeed be used in many applications instead of EPDM or other classical rubbers. Immediate applications for those polyolefins based rubbery materials can be found on the automotive and building industry. The relatively complex production process of EPDM is also very challenging for guaranteeing absence of production related variations.

One way of controlling the properties of polyolefin-derived plastomers is to graft polyolefins with silanes in a first step and cross-link the grafted products using a condensation catalyst in a second step. In the second step the silane grafted polymer is subjected to a silanol forming condensation catalyst and then exposed to humidity and/or heat to effect crosslinking. The crosslinking then takes place via formation of backbone-Si—O—Si-backbone' bonds. The provision of the grafted plastomer is a two-step process; i.e. the plastomer is polymerized first and grafted in a second processing step.

There is a need to provide solutions for increasing cross-linking speed.

SUMMARY OF THE INVENTION

The present invention relates to a process for providing a cross-linked composition, the process comprising the steps of
(a) providing an ethylene-α-olefin plastomer having
a density of from 850 kg/m$^3$ to 900 kg/m$^3$; and
an melt flow rate (ISO 1133, 2.16 kg, 190° C.) of 0.3 to 50 g/10 min;
(b) grafting the ethylene-α-olefin plastomer with silane crosslinker such that the content of silane crosslinker is in the range of 0.1 to 10.0 wt. % with respect to the grafted ethylene-α-olefin plastomer;
(c) contacting said grafted ethylene-α-olefin plastomer with 2 to 8 wt. % of a tin-free silane crosslinking catalyst with respect to the resulting mixture of grafted ethylene-α-olefin plastomer and tin-free silane crosslinking catalyst,
the tin-free silane crosslinking catalyst comprising a Bronsted acid; at 23° C. and 50% relative humidity for at least 15 minutes thus forming a cross-linked composition, wherein gel content of said cross-linked composition after 15 min is at least 60%.

According to the present invention, step b) may take place in an extruder. Step b) may take place at a temperature 120 to 210° C. Further, step b) may be initiated by a free radical forming agent, preferably a peroxide.

According to the present invention, step c) may take place in an extruder and/or at a temperature 120 to 210° c.

Ethylene-α-Olefin Plastomer

Plastomer denotes a polymer material which combines qualities of elastomers and plastics.

The optional ethylene-α-olefin plastomer may have a density in the range of from 860 to 900 kg/m$^3$, preferably in the range of from 865 to 895 kg/m$^3$ and more preferably in the range of from 870 to 890 kg/m$^3$.

The MFR2 (190° C./2.16 kg) measured according to ISO 1133 of the optional ethylene-α-olefin plastomer is in the range of from 0.3 to 50.0 g/10 min, preferably in the range of from 0.4 to 45.0 g/10 min, more preferably in the range of from 0.5 to 35.0 g/10 min and most preferably 0.5-2 g/10 min.

Suitable ethylene-based plastomers may have an ethylene content from 60.0 to 95.0 wt %, preferably from 65.0 to 90.0 wt % and more preferably from 70.0 to 88.0 wt %. The comonomer contribution preferably is up to 40.0 wt %, more preferably up to 35.0 wt %. The comonomer contents of conventional ethylene plastomers are familiar to the person skilled in the art.

The ethylene based plastomer may be a copolymer of ethylene and propylene or a C4-C10 alpha-olefin. Suitable C4-C10 alpha-olefins include 1-butene, 1-hexene and 1-octene, preferably 1-butene or 1-octene and more preferably 1-octene. Preferably copolymers of ethylene and 1-octene are used.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is from 33 to 115° C.

Furthermore suitable ethylene based plastomers may have a glass transition temperature Tg (measured by DMTA according to ISO 6721-7) of below −40° C., preferably below −54° C., more preferably below −58° C.

The Mw/Mn value of the ethylene based plastomer, representing the broadness of the molecular weight distribution (MWD), is preferably in the range of from 1.5 to 5.0, more preferably in the range of from 2.0 to 4.5, even more preferably in the range of from 2.5 to 4.0.

The ethylene-based plastomer can be unimodal or multimodal, preferably unimodal.

Preferably, the PE plastomer is a metallocene-catalysed polymer although Ziegler-Natta based polyethylene plastomers are also possible.

Suitable ethylene based plastomers can be any copolymer of ethylene and propylene or ethylene and C4-C10 alpha olefin having the above defined properties, which are commercial available, i.e. from *Borealis* AG (AT) under the tradename Queo, from DOW Chemical Corp (USA) under the tradename Engage or Affinity, or from Mitsui under the tradename Tafmer.

Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably, these ethylene-based plastomers are prepared by a one stage or two-stage solution polymerization process, especially by high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon that may be unsubstituted or substituted by a C1-4 alkyl group such as pentane, methyl pentane, hexane, heptane, octane, cyclohexane, methylcyclohexane and hydrogenated naphta. More preferably, unsubstituted C6-10-hydrocarbon solvents are used.

Grafting may be performed in any manner known in the art. The grafted ethylene-α-olefin plastomer may be formed into pellets.

According to the present invention, the gel content of the cross-linked composition after 15 min may be at least 70%, preferably at least 80%.

Process according to any of the preceding claims, wherein the gel content of the cross-linked composition is above 90 wt. % after 48 hours at 50% relative humidity and 23° C.

Silane Crosslinker

A silane crosslinker can be used to covalently graft silane moieties onto the first and second polyolefins and the silane crosslinker may include alkoxysilanes, silazanes, siloxanes, or a combination thereof. The grafting and/or coupling of the various potential silane crosslinkers or silane crosslinker molecules is facilitated by the reactive species formed by the grafting initiator reacting with the respective silane crosslinker.

In some aspects, the silane crosslinker is a silazane where the silazane may include, for example, hexamethyldisilazane (HMDS) or Bis(trimethylsilyl)amine. In some aspects, the silane crosslinker is a siloxane where the siloxane may include, for example, polydimethylsiloxane (PDMS) and octamethylcyclotetrasiloxane.

In some aspects, the silane crosslinker is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —$NH_2$, —$NHCH_3$ or —$N(CH_3)_2$; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl tri methoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gammamethacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane.

An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl tri methoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; maminophenyl trimethoxysilane; p-aminophenyl trimethoxysilane; (3-trimethoxysilylpropyl)diethylenetriamine; N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycysil)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1, 1-(triethoxysilyl)undecanol; triethoxysilyl undecanol; ethylene glycol acetal; and N-(3-ethoxysilylpropyl)gluconamide.

In some aspects, the alkylsilane may be expressed with a general formula: $R_nSi(OR')_{4-n}$ wherein: n is 1, 2 or 3; R is a C1-20 alkyl or a C2-20 alkenyl; and R' is an C1-20 alkyl.

The term "alkyl" by itself or as part of another substituent, refers to a straight, branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, C1-6 alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers. The term "C2-20 alkenyl" by itself or as part of another substituent, refers to an unsaturated hydrocarbyl group, which may be linear, or branched, comprising one or more carbon-carbon double bonds having 2 to 20 carbon atoms. Examples of C2-6 alkenyl groups are ethenyl, 2-propenyl, 2-butenyl, 3-butenyl, 2-pentenyl and its isomers, 2-hexenyl and its isomers, 2,4-pentadienyl and the like.

In some aspects, the alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltriethoxysilane; octyltrimethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenylmethyldimethoxysilane, phenyltrimethoxysilane, phenyltrimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, and a combination thereof.

In some aspects, the alkylsilane compound may be selected from triethoxyoctylsilane, trimethoxyoctylsilane, and a combination thereof.

Additional examples of silanes that can be used as silane crosslinkers include, but are not limited to, those of the general formula CH$_2$=CR—(COO)x(CnH$_2$n)ySiR'3, wherein R is a hydrogen atom or methyl group; x is O or 1; y is O or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some aspects, no more than one of the three R' groups is an alkyl. In other aspects, not more than two of the three R' groups is an alkyl.

Any silane or mixture of silanes known in the art that can effectively graft to and crosslink an olefin polymer can be used in the practice of the present disclosure. In some aspects, the silane crosslinker can include, but is not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups. In other aspects, the silane crosslinkers are unsaturated alkoxy silanes which can be grafted onto the polymer. In still other aspects, additional exemplary silane crosslinkers include vi nylt-rimethoxysilane, vinyltriethoxysilane, 3-(trimethoxysilyl)propyl methacrylate gamma-(meth)acryloxypropyl trimethoxysilane), and mixtures thereof.

The silane crosslinker may be present in the silane-grafted polyolefin elastomer in an amount of from greater than 0 wt % to about 10 wt %, including from about 0.5 wt % to about 5 wt %. The amount of silane crosslinker may be varied based on the nature of the olefin polymer, the silane itself, the processing conditions, the grafting efficiency, the application, and other factors. The amount of silane crosslinker may be at least 2 wt %, including at least 4 wt % or at least 5 wt %, based on the weight of the reactive composition. In other aspects, the amount of silane crosslinker may be at least 10 wt %, based on the weight of the reactive composition. In still other aspects, the silane crosslinker content is at least 1% based on the weight of the reactive composition. In some embodiments, the silane crosslinker fed to the extruder may include from about 0.5 wt % to about 10 wt % of silane monomer, from about 1 wt % to about 5 wt % silane monomer, or from about 2 wt % to about 4 wt % silane monomer.

Cross-Linking Catalyst

The cross-linking catalyst according to the present invention may be an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenanthrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

Ar(SO$_3$H)x      (II)

with Ar being an aryl group which may be substituted or non-substituted, and x being at least 1.

The organic aromatic sulphonic acid cross-linking catalyst may comprise the structural unit according to formula (II) one or several times, e.g. two or three times. For example, two structural units according to formula (II) may be linked to each other via a bridging group such as an alkylene group.

Ar may be an aryl group which is substituted with at least one C4- to C30-hydrocarbyl group, more preferably C4- to C30-alkyl group.

Aryl group Ar preferably is a phenyl group, a naphthalene group or an aromatic group comprising three fused rings such as phenanthrene and anthracene.

Preferably, in formula (II) x is 1, 2 or 3, and more preferably x is 1 or 2.

Furthermore, preferably the compound used as organic aromatic sulphonic acid cross-linking catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The cross-linking catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

The sulphonic acid cross-linking catalyst may be selected from those as described in EP 1 309 631 and EP 1 309 632, namely a) a compound selected from the group of
  (i) an alkylated naphthalene monosulphonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;
  (ii) an arylalkyl sulphonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;
  (iii) a derivative of (i) or (ii) selected from the group consisting of an anhydride, an ester, an acetylate, an epoxy blocked ester and an amine salt thereof which is hydrolysable to the corresponding alkyl naphthalene monosulphonic acid or the arylalkyl sulphonic acid;
  (iv) a metal salt of (i) or (ii) wherein the metal ion is selected from the group consisting of copper, aluminum, tin and zinc; and b) a compound selected from the group of
  (i) an alkylated aryl disulphonic acid selected from the group consisting of the structure (III):

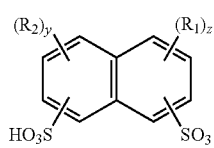

(III)

and the structure (IV):

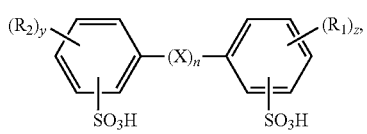

(IV)

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(=O)— wherein n is 1; —S—, wherein n is 1 to 3 and S(O)$_2$—, wherein n is 1; and
  (ii) a derivative of (i) selected from the group consisting of the anhydrides, esters, epoxy blocked sulphonic acid esters, acetylates, and amine salts thereof which is a hydrolysable to the alkylated aryl disulphonic acid, together with all preferred embodiments of those sulphonic acids as described in the mentioned European Patents.

Preferably, in the polyolefin composition according to the invention the cross-linking catalyst is present in an amount of 0.0001 to 6 wt %, more preferably of 0.001 to 6 wt %, and most preferably 0.02 to 5 wt %.

The cross-linking catalyst may be added to the silane group containing polyolefin by compounding the polymer with a so-called master batch, in which the catalyst, and optionally further additives are contained in a polymer, e.g. polyolefin, matrix in concentrated form.

The matrix polymer may be a polyolefin, more preferably a polyethylene, which may be a homo- or copolymer of ethylene, e.g. low density polyethylene, or polyethylene-methylethyl-butyl-acrylate copolymer containing 1 to 50 wt % of the acrylate, and mixtures thereof.

As stated, in the master batch the compounds to be added to the silane group containing polyolefin are contained in concentrated form, i.e. in a much higher amount than in the final composition.

The master batch preferably comprises cross-linking catalyst in an amount of from 0.3 to 6 wt %, more preferably from 0.7 to 3.5 wt %.

The master batch may be processed with the silane group containing polymer in an amount of from 1 to 10 wt %, more preferably from 2 to 8 wt %.

A grafting initiator (also referred to as "a radical initiator" in the disclosure) can be utilized in the grafting process of at least the first and second polyolefins by reacting with the respective polyolefins to form a reactive species that can react and/or couple with the silane crosslinker molecule. The grafting initiator can include halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy) hexyne-3, 1,3-bis(t-butyl-peroxyisopropyl) benzene, n-butyl-4,4-bis(t-butyl-peroxy)valerate, benzoyl peroxide, tbutylperoxybenzoate, t-butylperoxy isopropyl carbonate, and t-butylperbenzoate, as well as bis(2-methyl benzoyl) peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3,3,5-tri methylcyclohexane, α,α'-bis(t-butylperoxy)-1,3-diisopropylbenzene, α,α'-bis(tbutylpexoxy)-1,4-diisopropylbenzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (available from Arkema, Inc.).

In some aspects, the grafting initiator is present in an amount of from greater than 0 wt % to about 2 wt % of the composition, including from about 0.15 wt % to about 1.2 wt % of the composition. The amount of initiator and silane employed may affect the final structure of the silane-grafted polymer (e.g., the degree of grafting in the grafted polymer and the degree of crosslinking in the cured polymer). In some aspects, the reactive composition contains at least 100 ppm of initiator, or at least 300 ppm of initiator. The initiator may be present in an amount from 300 ppm to 1500 ppm, or from 300 ppm to 2000 ppm. The silane initiator weight ratio may be from about 20:1 to 400:1, including from about 30:1 to about 400:1, from about 48:1 to about 350:1, and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in a melt, in solution, in a solid-state, and/or in a swollen-state. The silanation may be performed in a wide variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature (i.e., the temperature at which the polymer starts melting and starts to flow) may be from about 120° C. to about 260° C., including from about 130° C. to about 250° C.

Optional Additional Components

The silane-crosslinked polyolefin plastomer may optionally include one or more fillers. The filler(s) may be extruded with the silane-grafted polyolefin and in some aspects may include additional polyolefins having a crystallinity greater than 20%, greater than 30%, greater than 40%, or greater than 50%. In some aspects, the filler(s) may include metal oxides, metal hydroxides, metal carbonates, metal sulfates, metal silicates, clays, talcs, carbon black, and silicas. Depending on the application and/or desired properties, these materials may be fumed or calcined.

The metal of the metal oxide, metal hydroxide, metal carbonate, metal sulfate, or metal silicate may be selected from alkali metals (e.g., lithium, sodium, potassium, rubidium, caesium, and francium); alkaline earth metals (e.g., beryllium, magnesium, calcium, strontium, barium, and radium); transition metals (e.g., zinc, molybdenum, cadmium, scandium, titanium, vanadium, chromium, manganese, iron, cobalt, nickel, copper, yttrium, zirconium, niobium, technetium, ruthernium, rhodium, palladium, silver, hafnium, taltalum, tungsten, rhenium, osmium, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, *neptunium*, plutonium, americium, curium, berkelium, californium, einsteinium, fermium, mendelevium, nobelium, and lawrencium); germanium; arsenic; antimony; and astatine.

The filler(s) of the silane-crosslinked polyolefin plastomer or blend may be present in an amount of from greater than 0 wt % to about 50 wt %, including from about 1 wt % to about 20 wt % and from about 3 wt % to about 10 wt %.

The silane-crosslinked polyolefin plastomer and/or the respective articles formed (e.g., static sealing members 12) may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes). In some embodiments, the wax(es) are present in an amount of from about 0 wt % to about 10 wt %.

Tackifying resins (e.g., aliphatic hydrocarbons, aromatic hydrocarbons, modified hydrocarbons, terpenes, modified terpenes, hydrogenated terpenes, rosins, rosin derivatives, hydrogenated rosins, and mixtures thereof) may also be included in the silane-crosslinked polyolefin plastomer/blend. The tackifying resins may have a ring and ball softening point in the range of from 70° C. to about 150° C. and a viscosity of less than about 3,000 cP at 177° C. In some aspects, the tackifying resin(s) are present in an amount of from about 0 wt % to about 10 wt %.

In some aspects, the silane-crosslinked polyolefin plastomer may include one or more oils. Non-limiting types of oils include white mineral oils and naphthenic oils. In some embodiments, the oil(s) are present in an amount of from about 0 wt % to about 10 wt %.

In some aspects, the silane-crosslinked polyolefin plastomer may include one or more filler polyolefins having a crystallinity greater than 20%, greater than 30%, greater than 40%, or greater than 50%. The filler polyolefin may include polypropylene, poly(ethylene-co-propylene), and/or other ethylene/α-olefin copolymers. In some 30 aspects, the use of the filler polyolefin may be present in an amount of from about 5 wt % to about 60 wt %, from about 10 wt % to about 50 wt %, from about 20 wt % to about 40 wt %, or from about 5 wt % to about 20 wt %. The addition of the filler polyolefin may increase the Young's modulus by at least 10%, by at least 25%, or by at least 50% for the final silane-crosslinked polyolefin plastomer.

In some aspects, the silane-crosslinked polyolefin plastomer of the present disclosure may include one or more stabilizers (e.g., antioxidants). The silane-crosslinked polyolefin plastomer may be treated before grafting, after grafting, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 wt %, including less than 0.2 wt % of the composition.

In some aspects, a coloring agent may be added to the silane-crosslinked polyolefin plastomer during its production as the silane-crosslinkable polyolefin plastomer or the silane-grafted polyolefin plastomer. In some aspects, the coloring agent may be added in combination with the condensation catalyst (e.g., LE4423/AMBICAT™) and can include colors that include, for example, black (PPM1200/2), blue (PPM1201/2), brown (PPM1202/2), green (PPM1203/2), grey (PPM1204/2), orange (PPM1205/2), red (PPM1206/2), violet (PPM1207/2), white (PPM1208/2), and/or yellow (PPM1200/2) as provided by commercial suppliers.

Experimental Part

Materials

Plastomers P1-P3 are ethylene octene copolymers.
Reference resin R1 is poly(ethylene-co-ethylenetrimethoxysilane).
Reference resin R2 is a terpolymer of ethylene, methyl acrylate (21 wt %) and VTMS.
Cross-linking catalyst is Ambicat LE44 76.

Measurement Methods

Degree of Crosslinking (Gel Content)

Degree of crosslinking was measured by decalin extraction according to ASTM D 2765-01, Method A on the crosslinked material.

Sample Preparation

The sample preparation was done as following:

The tested resins were dry blended (mixed) with catalyst masterbatches and then extruded into tapes. Tape samples were produced on a Collin extruder (Teach-Line E20T) with a temperature profile of 120-130-140° C. The tape samples had a thickness of 2 mm and a width of 40 mm.

Cross-Linking

The samples were crosslinked in a conditioned room having 50% humidity at 23° C. for 24 h.

EXAMPLES

Inventive Examples IE1-IE3 and Comparative Examples CE1 and CE2 were treated with silane crosslinking catalyst Ambicat LE4476 under the conditions given below.

TABLE 1

| Example | Base resin |  |  |  |  | Gel content after crosslinking |  |
|---|---|---|---|---|---|---|---|
|  | Name | MFR (g/10 min) | Density (kg/m$^3$) | VTMS % | Ambicat LE4476 | 15 min after extrusion | 48 h at RT |
| IE1 | P1 | 0.5 | 863 | 2.0 | 5% | 81% | 96% |
| IE2 | P2 | 1 | 857 | 1.8 | 5% | 87% | 96% |
| IE3 | P3 | 0.5 | 861 | 1.7 | 5% | 60% | 96% |
| CE1 | R1 | 1 | 922 | 1.4 | 5% | 0 | 70 |
| CE2 | R2 | 16 | 944 | 1.3 | 5% | 0 | 40 |

As may be seen, polymerized silane resins R1 and R2 resulted in 0% gel content after tape extrusion and 70 and 40% respectively after 48 h.

However, when using plastomers P1-P3, which have been VTMS grafted, a surprising increase in cross-linking speed was observed (60 to 87% gel content after tape extrusion). Therefore, an instant crosslinking completion is achieved after extruding the tapes, since many customers consider a good level of crosslinking degree at 70% gel content. In all cases finish surface looks acceptable.

The invention claimed is:

1. A process for providing a cross-linked composition, the process comprising the steps of (a) providing an ethylene-α-olefin plastomer which is a copolymer of ethylene and 1-octene and providing no other polymer, the ethylene-α-olefin plastomer having a density of from 850 kg/m$^3$ to 900 kg/m$^3$; and
a melt flow rate (ISO 1133, 2.16 kg, 190° C.) of 0.3 to 50 g/10 min;

(b) grafting the ethylene-α-olefin plastomer from step (a) with a silane crosslinker such that the content of the silane crosslinker is in the range of 0.1 to 10.0 wt. % with respect to the resulting grafted ethylene-α-olefin plastomer; and (c) contacting said grafted ethylene-α-olefin plastomer from step (b) with 2 to 8 wt. % of a tin-free silane crosslinking catalyst with respect to the resulting mixture of grafted ethylene-α-olefin plastomer and tin-free silane crosslinking catalyst to form an intermediate composition, which in turn forms a cross-linked composition having a gel content of at least 60% when subjected to 23° C. and 50% humidity for 15 minutes, and wherein said tin-free catalyst comprises a sulfonic acid;

wherein step c) is carried out:
in an extruder; and/or
at a temperature 120 to 210° C.

2. The process according to claim 1, wherein the ethylene-α-olefin plastomer has
a density of from 865 to 895 kg/m$^3$; and
a melt flow rate (ISO 1133, 2.16 kg, 190° C.) of 0.40 to 2 g/10min.

3. The process according to claim 1, wherein the ethylene content of the ethylene-a-olefin plastomer is from 60.0 to 95.0 wt %.

4. The process according to claim 1, wherein the 1-octane content of the ethylene-α-olefin plastomer is up to 40.0 wt %.

5. The process according to claim 1, wherein a gel content of said cross-linked composition after 15 min of contacting is at least 70%.

6. The process according to claim 1, wherein step b) takes place
in an extruder; and/or
at a temperature 120 to 210° C.

7. The process according to claim 1, wherein step b) is initiated by a free radical forming agent.

8. The process according to claim 1, wherein the grafted ethylene-α-olefin plastomer is formed into pellets.

* * * * *